United States Patent
Sugita et al.

(10) Patent No.: US 7,586,692 B2
(45) Date of Patent: Sep. 8, 2009

(54) IMAGE-PICKUP APPARATUS, LENS APPARATUS AND IMAGE-PICKUP SYSTEM

(75) Inventors: Jun Sugita, Sagamihara (JP); Masanori Ishikawa, Saitama (JP); Hiroshi Akada, Kawasaki (JP); Katsuhiro Inoue, Utsunomiya (JP); Sawako Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/858,066

(22) Filed: Sep. 19, 2007

(65) Prior Publication Data

US 2008/0074965 A1 Mar. 27, 2008

(30) Foreign Application Priority Data

Sep. 21, 2006 (JP) ............................. 2006-255262

(51) Int. Cl.
G02B 15/14 (2006.01)
(52) U.S. Cl. ....................... 359/694; 396/379
(58) Field of Classification Search ................. 359/694; 396/379
See application file for complete search history.

(56) References Cited

U.S. PATENT DOCUMENTS 4,682,871 A 7/1987 Metabi

| 2003/0147001 A1* | 8/2003 | Kikuchi et al. ............. 348/363 |
| 2003/0161049 A1* | 8/2003 | Okada et al. ................ 359/696 |
| 2004/0223756 A1 | 11/2004 | Nakano |

FOREIGN PATENT DOCUMENTS

| JP | 58-090625 A | 5/1983 |
| JP | 58-090626 B | 5/1983 |
| JP | 05-249539 A | 9/1993 |
| JP | 63-155039 A | 6/1998 |
| JP | 2002-156681 A | 5/2002 |
| WO | 2005-083506 A1 | 9/2005 |

* cited by examiner

Primary Examiner—Jordan M. Schwartz
Assistant Examiner—James C Jones
(74) Attorney, Agent, or Firm—Canon U.S.A., Inc. I.P. Division

(57) ABSTRACT

The image-pickup apparatus includes a controller that controls the energization of the actuator for driving the aperture stop. The controller receives from a lens apparatus information on a time period for controlling the energization of the actuator, the information being set corresponding to the type of the actuator. During an image-pickup period in a state in which the aperture stop has been driven to a target aperture position, the controller outputs to the lens apparatus an instruction for stopping the energization of the actuator or reducing the energization amount thereof in response to the elapse of the time period. This can reduce power consumption.

6 Claims, 8 Drawing Sheets

| DATA CODE | ACTUATOR TYPE | ENERGIZATION-STOPPINGTIME (SHUTTER TIME) |
|---|---|---|
| 1 | TYPE I | 1/2 |
| 2 | TYPE II | 1 |
| 3 | TYPE III | 2 |
| 4 | TYPE IV | 4 |

FIG. 2

IMAGE-PICKUP APPARATUS, LENS APPARATUS AND IMAGE-PICKUP SYSTEM

BACKGROUND OF THE INVENTION

1. Field of the Invention

The present invention relates to an image-pickup system including a lens apparatus with an aperture stop and an image-pickup apparatus that controls energization of an actuator for the aperture stop based on information received from the lens apparatus.

2. Description of the Related Art

A lens apparatus mounted to an image-pickup apparatus such as a digital still camera is equipped with an aperture stop (a light-amount-adjusting unit) driven by an actuator such as a stepping motor or a galvanometer. Such a lens apparatus controls the driving of the aperture stop in accordance with an energization instruction from the image-pickup apparatus. In this case, energization of the aperture stop is usually maintained in order to prevent the aperture diameter of the aperture stop from changing due to disturbances such as a shock given after the aperture stop has been driven to an instructed position (target aperture position).

When a long shutter time is set in the image-pickup apparatus, an energization-maintaining time of the aperture stop is increased, thus correspondingly increasing the power consumption. To cope with this, Japanese Patent Laid-Open No. 58(1983)-90626 discloses a technology of suppressing the power consumption by performing a so-called PWM control, i.e., intermittent energization of an aperture stop after the aperture stop has been driven to an instructed position.

The image-pickup system is usually provided with a function called small-aperture preview that enables the confirmation of depth of field in association with a set aperture value. When the small-aperture preview function is used, if electric power is always fed to the aperture stop for keeping a constant aperture diameter, the power consumption will be correspondingly increased. To cope with this, Japanese Patent Laid-Open No. 2002-156681 discloses a technology in which power supply is stopped to the aperture stop after the aperture stop has been driven to a set value by the small-aperture preview function.

However, there are various types of motors available as an actuator for the aperture stop, including one being good or poor in ability of holding its rotation position when energization is stopped, one packaged in a metal case and one packaged with a resin material, for example.

In this case, if the system is shifted uniformly to an intermittent energizing state or the energization of the aperture stop is uniformly stopped after the drive of the aperture stop to a set value as in the technology disclosed in Japanese Patent Laid-Open No. 58(1983)-90626 or Japanese Patent Laid-Open No. 2002-156681, the aperture diameter may not be kept constant or a sufficient effect for reducing the power consumption may not be obtained because of unnecessary intermittent energization. Further, since a motor packaged with a resin material has less heat-resistance, if such a motor is energized intermittently for a long time, heat generated from the motor may adversely affect the resin material.

SUMMARY OF THE INVENTION

The present invention provides an image-pickup apparatus, an image-pickup system and a lens apparatus that are capable of stopping the energization of an actuator for driving an aperture stop or reducing the energization amount thereof at a timing suitable for type of the actuator.

According to an aspect, the present invention provides an image-pickup apparatus to which a lens apparatus including an aperture stop is detachably mounted. The image-pickup apparatus includes a controller that controls energization of an actuator for driving the aperture stop. The controller receives from the lens apparatus information on a time period for controlling the energization of the actuator, the information being set corresponding to the type of the actuator. During an image-pickup period in a state in which the aperture stop has been driven to a target aperture position, the controller outputs to the lens apparatus an instruction for stopping the energization of the actuator or reducing an energization amount in response to the elapse of the time period.

According to another aspect, the present invention provides an image-pickup apparatus to which a lens apparatus including an aperture stop is detachably mounted, the lens apparatus outputting information on the type of an actuator for driving the aperture stop and the image-pickup apparatus receiving the information. The image-pickup apparatus includes a controller that controls energization of the actuator. During an image-pickup period in a state in which the aperture stop has been driven to a target aperture position, the controller outputs to the lens apparatus an instruction for stopping the energization of the actuator or reducing an energization amount in response to the elapse of a time period set corresponding to the information.

According to still another aspect, the present invention provides an image-pickup system including the above-described image-pickup apparatus, and a lens apparatus detachably mounted to the image-pickup apparatus. The lens apparatus includes an aperture stop, a memory that stores information on the type of an actuator for driving the aperture stop, and a communication part that outputs the information to the image-pickup apparatus.

According to further still another aspect, the present invention provides a lens apparatus detachably mounted to the above-described image-pickup apparatus. The lens apparatus includes an aperture stop, a memory that stores information on the type of an actuator for driving the aperture stop, and a communication part that outputs the information to the image-pickup apparatus.

Other aspects of the present invention will become apparent from the following description and the attached drawings.

BRIEF DESCRIPTION OF THE DRAWINGS

FIG. 2 shows an example of correspondence between an aperture stop actuator and its energization-stopping time period in Embodiment 1;

DESCRIPTION OF THE EMBODIMENTS

Embodiments of the present invention will now be described with reference to the accompanying drawings.

Embodiment 1

Figure 1:
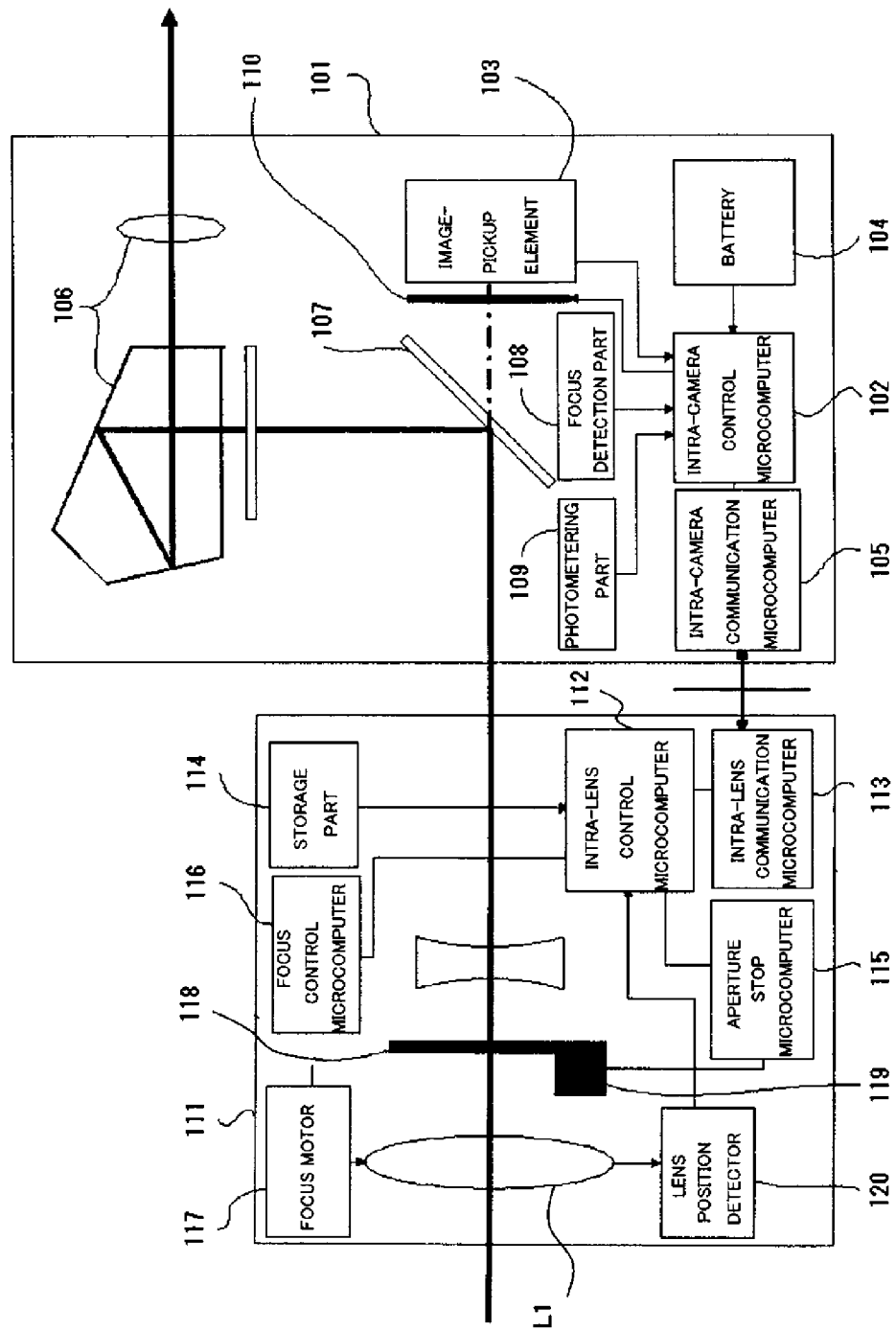
FIG. 1 is a block diagram showing the configuration of a camera system that is Embodiment 1 of the present invention.

FIG. 1 shows the configuration of a camera system (image-pickup system) including an interchangeable lens (lens apparatus) and a single-lens reflex digital camera (image-pickup apparatus) that is Embodiment 1 of the present invention.

Reference numeral 101 denotes a camera in the camera system, and 111 denotes an interchangeable lens (hereinafter simply referred to as a lens).

The configuration of the camera 101 will be described below. The camera 101 is provided with an optical finder 106, a quick return mirror 107 leading a light flux from the lens 111 to the optical finder 106, and a photometering part 109 that measures the amount of light from the lens 111. The camera 101 is further provided with an image-pickup element 103 such as a CCD sensor or a CMOS sensor that photoelectrically converts an object image formed by the lens 111.

The camera 101 is still further provided with a focus detection part 108 that detects a focus state of the lens 111 by a TTL phase-difference detection method and a shutter 110 that is for controlling an exposure time period of the image-pickup element 103.

An intra-camera control microcomputer 102 (hereinafter referred to as a camera microcomputer 102) controls respective parts in the camera 101 and the lens 111.

An intra-camera communication microcomputer 105 (hereinafter referred to as a camera communication microcomputer 105) controls serial communication with the lens 111 via a communication contact (not shown) that is provided at a mount part between the camera 101 and the lens 111.

The camera 101 is further provided with a power supply (battery) 104, from which electric power is supplied to the camera 101 and the lens 111.

Next, the configuration of the lens 111 will be described below. The lens 111 is provided with an image-pickup optical system including a focus lens L1 and an aperture stop 118. The lens 111 is further provided with an aperture stop control microcomputer 115 (hereinafter referred to as an aperture stop microcomputer 115) and a focus control microcomputer 116 (hereinafter referred to as a focus microcomputer 116).

The lens 111 is further provided with a lens position detector 120 that detects a position of the focus lens L1 and an intra-lens communication microcomputer 113 (hereinafter referred to as a lens communication microcomputer 113) that controls the serial communication with the camera 101.

An intra-lens control microcomputer 112 (hereinafter referred to as a lens microcomputer 112) controls the operations of respective parts in the lens 111 in accordance with instructions from the camera microcomputer 102.

For instance, upon receipt of an aperture-stop-driving instruction from the camera microcomputer 102 via the camera communication microcomputer 105 and the lens communication microcomputer 113, the lens microcomputer 112 outputs a control signal to the aperture stop microcomputer 115. The aperture stop microcomputer 115 controls the energization of the stepping motor 119 to drive the aperture stop 118 to a target aperture position included in the control signal (in other words, a target aperture value or a target aperture diameter).

Upon receipt of a focus-driving instruction from the camera microcomputer 102 via the camera communication microcomputer 105 and the lens communication microcomputer 113, the lens microcomputer 112 outputs a control signal to the focus microcomputer 116. The focus microcomputer 116 drives a focus motor 117 to move the focus lens L1 to a target focus position included in the control signal, while monitoring the lens position detected by the lens position detector 120.

A memory (not shown) in the lens microcomputer 112 stores sensitivity information on the focus lens L1 and movement amount information on the focus lens L1 for a unit rotation angle of the focus motor 117.

The lens 111 is further provided with a storage part 114 that stores information on the aperture stop 118 provided in the lens 111. The information on the aperture stop 118 contains the type (specifications) of the stepping motor 119 serving as the actuator of the aperture stop 118. The types of the stepping motor 119 can be classified based on a difference in ability of holding the rotation position of the motor 119 when energization thereof is stopped or a difference in package material of the stepping motor 119.

This information on the aperture stop may be included in lens identification information that the camera microcomputer 102 uses for identifying the lens 111 provided in the camera 101.

The storage part 114 further stores information indicating a time period when the energization of the stepping motor 119 is to be stopped during the image-pickup period (shutter time) in the state where the aperture stop has been driven to the target aperture position that is calculated for appropriate exposure of the image-pickup element 103 or is set by a photographer. Hereinafter, this time period for the aperture stop will be referred to as an energization-stopping time period.

FIG. 2 shows an example of the correspondence between the types of the stepping motor 119 used for the aperture stop 118 in the lens 111 that can be mounted to the camera 101 and their corresponding energization-stopping time periods (shutter times).

In the case where the lens 111 is equipped with a stepping motor 119 of type I, the storage part 114 stores a data code "1". The energization-stopping time period set corresponding to this type is ½ second. In a similar manner, in the case of type II, a data code of "2" is stored, which corresponds to the energization-stopping time period of 1 second. In the case of type III, a data code of "3" is stored, which corresponds to the energization-stopping time period of 2 seconds. In the case of type IV, a data code of "4" is stored, which corresponds to the energization-stopping time period of 4 seconds. Practically, these data codes are sent to the camera microcomputer 102 as the information on the type of the stepping motor 119.

The energization-stopping time period for each type is set so that the image-pickup will be hardly affected even if the aperture position changes when the energization of the stepping motor 119 is stopped after the aperture stop 118 has been driven to the target aperture position to start the image-pickup operation.

For instance, upon receipt of information on the energization-stopping time period of type II, if the shutter time set for appropriate exposure of the image-pickup element 103 is longer than 1 second, the camera microcomputer 102 sends an energization-stopping instruction to the lens microcomputer 112 in response to the elapse of 1 second. Upon receipt of the energization-stopping instruction, the lens microcomputer 112 causes the energization of the stepping motor 119 to be stopped via the aperture stop microcomputer 115.

The same goes for the case where the camera microcomputer 102 receives information on the energization-stopping time period of other types of stepping motor.

Referring now to the flowchart of FIG. 3, an operation of the camera system in the present embodiment will be described below. This operation is executed by the camera microcomputer 102 and the lens microcomputer 112 in accordance with computer programs stored therein.

At step 001 (S001), in response to an ON operation of a power switch of the camera or in response to the placement of the lens 111 onto the camera 101, the camera microcomputer 102 initializes various data values.

At S002, the lens microcomputer 112 sends lens identification information to the camera microcomputer 102. The camera microcomputer 102 reads information required for the lens control such as a fully-opened aperture value, aperture steps and a focal length of the lens 111, the required information being included in the lens identification information.

At S003, the camera microcomputer 102 reads the above-stated type information (data code) on the stepping motor 119 and information on the energization-stopping time period that are sent from the lens microcomputer 112.

At S004, the camera microcomputer 102 determines whether or not a half-stroke operation (described as SW1 ON in the drawing) of a release switch (not shown) provided on the camera 101 has been made. If the half-stroke operation has been made, the process proceeds to S005 where the camera microcomputer 102 reads the aperture value (target aperture value, hereinafter referred to as the set aperture value) set by a photographer.

Next, at S006, the camera microcomputer 102 calculates a shutter time (image-pickup period) for an appropriate exposure of the image-pickup element 103 based on the set aperture value and photometric information from the photometering part 109. At S007, the camera microcomputer 102 sets the thus calculated shutter time.

Next, at S008, the camera microcomputer 102 acquires a defocus amount from the focus detection part 108, and at S009, the camera microcomputer 102 calculates a driving amount of the focus lens L1 to an in-focus position based on the defocus amount. Then, at S010, the camera microcomputer 102 moves the focus lens L1 to an in-focus position.

At S011, the camera microcomputer 102 further determines whether or not a full-stroke operation (described as SW2 ON in the drawing) of the release switch has been made. If the full-stroke operation has been made, the process proceeds to S012 where the camera microcomputer 102 causes the quick return mirror 107 to move upward to the outside of an image-pickup optical path.

At S013, the camera microcomputer 102 compares the shutter time set at S007 with the energization-stopping time period read at S003. If the set shutter time is shorter than the energization-stopping time period, the process proceeds to S014 where the camera microcomputer 102 sends an aperture-stop-driving instruction to the lens microcomputer 112 so as to drive the aperture stop 118 to the set aperture value read at S005. Thereby, the lens microcomputer 112 energizes the stepping motor 119 via the aperture stop microcomputer 115. Then, the process proceeds to S017.

At S017, the camera microcomputer 102 opens the shutter 110. At this time, the camera microcomputer 102 also starts counting the shutter opening time. Then, at S018, the camera microcomputer 102 causes the image-pickup element 103 to start capturing of an image, and then the process proceeds to S019.

On the other hand, at S013, if the set shutter time is longer than the energization-stopping time period, the process proceeds to S015 where the camera microcomputer 102 sends an aperture-stop-driving instruction to the lens microcomputer 112 to drive the aperture stop 118 to the set aperture value read at S005. Thereby, the lens microcomputer 112 energizes the stepping motor 119 via the aperture stop microcomputer 115. Then, the process proceeds to S016.

At S016, the camera microcomputer 102 starts to count the energization time elapsed after the drive of the aperture stop 118 to the set aperture value. Then, the process proceeds to S025.

At S025, the camera microcomputer 102 opens the shutter 110. At this time, the camera microcomputer 102 also starts counting the shutter opening time. Then, at S026, the camera microcomputer 102 causes the image-pickup element 103 to start capturing of an image.

At S027, the camera microcomputer 102 determines whether or not the energization time that has been counted since S016 reaches the energization-stopping time period read at S003. If it has not reached the energization-stopping time period, the step S027 is repeated, and if it has reached the energization-stopping time period, the process proceeds to S028.

At S028, the camera microcomputer 102 sends an instruction for stopping the energization of the stepping motor 119 to the lens microcomputer 112. Upon receipt of this instruction, the lens microcomputer 112 stops the energization of the stepping motor 119 via the aperture stop microcomputer 115. Then, the process proceeds to S019.

At S019, the camera microcomputer 102 determines whether or not the shutter opening time that has been counted since S017 reaches the shutter time set at S007. If it has not reached the shutter time, the step S019 is repeated, and if it has reached the shutter time, the process proceeds to S020.

At S020, the camera microcomputer 102 closes the shutter 110. At S021, the camera microcomputer 102 sends to the lens microcomputer 112 an instruction for driving the aperture stop 118 to an open position. Upon receipt of this instruction, the lens microcomputer 112 energizes the stepping motor 119 via the aperture stop microcomputer 115 to drive the aperture stop 118 to the fully-opened position. Then, the process proceeds to S022.

At S022, the camera microcomputer 102 causes the quick return mirror 107 to move downward into the image-pickup optical path. Then, a series of the operation is completed.

Figure 4:
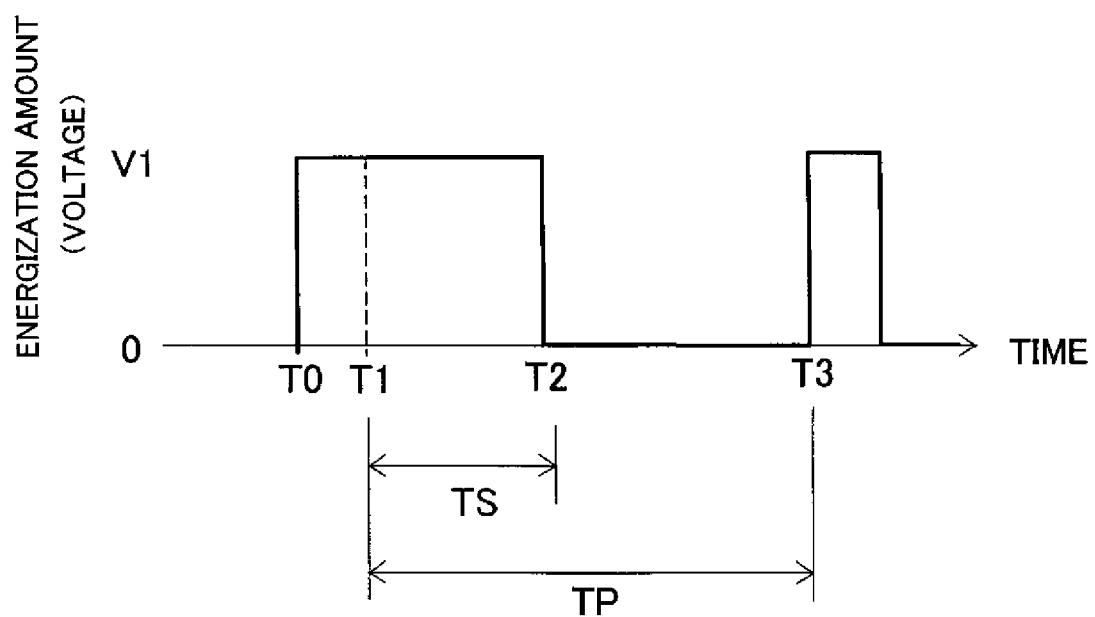
FIG. 4 shows a change in energizing state of the aperture stop actuator in the camera system of Embodiment 1.

FIG. 4 shows a change in the energizing state of the stepping motor 119 when the energization of the stepping motor 119 is stopped at the time when the energization time reaches the energization-stopping time period during the image-pickup period when the aperture stop 118 has been driven to the target aperture position.

At time T0, the energization (application of a voltage V1) of the stepping motor 119 is started to drive the aperture stop 118 to the target aperture position. At time T1, the drive of the aperture stop 118 to the target aperture position is completed, and the image-pickup operation is started. The image-pickup period (shutter opening time) is indicated by TP. Thereafter, the energization of the stepping motor 119 is maintained until the energization-stopping time period TS has elapsed (at time T2).

Then, after the energization-stopping time period TS has elapsed, the energization of the stepping motor 119 is stopped (energization amount is set to 0) until T3 at which time the image-pickup period TP is completed. When the image-pickup period TP is completed, the stepping motor 119 is energized again (by application of the voltage V1) to open the aperture stop 118.

As described above, according to the present embodiment, the energization of the stepping motor 119 is stopped when the energization time reaches the energization-stopping time period set corresponding to the type of the stepping motor 119 during the image-pickup period when the aperture stop 118 has been driven to the target aperture position. Thereby, the energization of the stepping motor 119 is stopped at a time suitable for the type of the stepping motor 119. Therefore, when using various types of stepping motors, the aperture position can be maintained, and power consumption thereof and heat generated therefrom can be sufficiently reduced.

Embodiment 2

Figure 5:
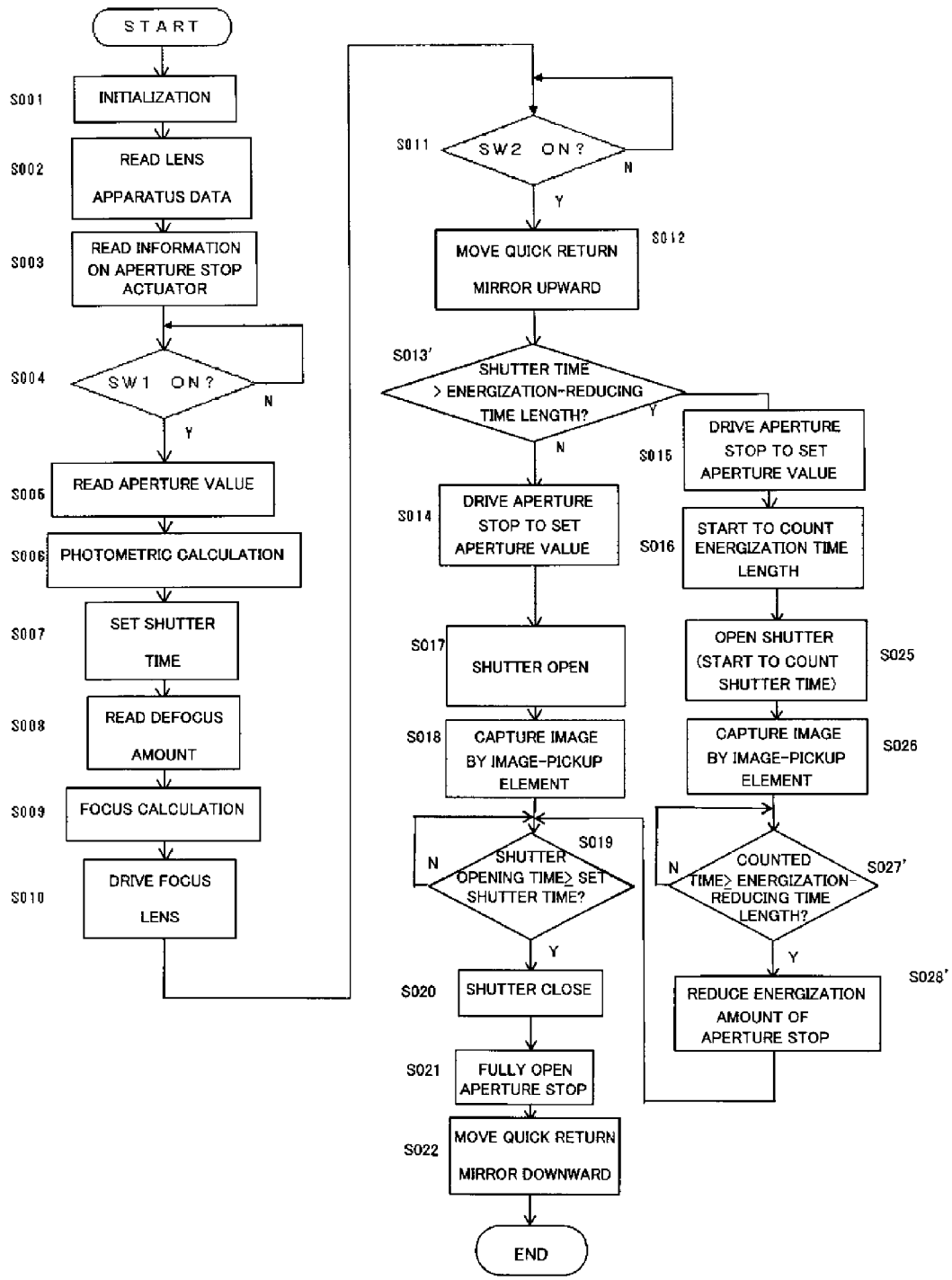
FIG. 5 is a flowchart showing an operation of the camera system that is Embodiment 2 of the present invention.

FIG. 5 is a flowchart showing operation of a camera system that is Embodiment 2 of the present invention. In the above-described Embodiment 1, the energization of the stepping motor 119 is stopped when the energization time reaches the energization-stopping time period during the image-pickup period when the aperture stop 118 has been driven to the target aperture position. On the other hand, in the present embodiment, the energization amount of the stepping motor 119 is not stopped, but is reduced.

The configuration of the camera system of the present embodiment is the same as that of Embodiment 1, and the same reference numerals will be assigned to components common to those of Embodiment 1.

In FIG. 5, S001 to S012 and S017 to S022 are the same as those in Embodiment 1. In the present embodiment, however, information on a time period sent from a lens microcomputer 112 at S003 will be referred to as an energization-reducing time period. The energization-reducing time period is set in a similar manner to the energization-stopping time period shown in FIG. 2.

At S013', a camera microcomputer 102 compares the shutter time set at S007 with the energization-reducing time period read at S003. If the set shutter time is shorter than the energization-reducing time period, the process proceeds to S014 where the camera microcomputer 102 sends an aperture-stop-driving instruction to the lens microcomputer 112 to drive the aperture stop 118 to the aperture value read at S005. Thereby, the lens microcomputer 112 energizes the stepping motor 119 via an aperture stop microcomputer 115. Then, the process proceeds to S017.

On the other hand, at S013', if the set shutter time is longer than the energization-reducing time period, the process proceeds to S015 where the camera microcomputer 102 sends an aperture-stop-driving instruction to the lens microcomputer 112 to drive the aperture stop 118 to the set aperture value read at S005. Thereby, the lens microcomputer 112 energizes the stepping motor 119 via the aperture stop microcomputer 115. Then, the process proceeds to S016.

At S016, the camera microcomputer 102 starts to count the energization time elapsed after the drive of the aperture stop 118 to the set aperture value. Then, the process proceeds to S025.

At S025, the camera microcomputer 102 opens the shutter 110. At this time, the camera microcomputer 102 also starts counting the shutter opening time. Then, at S026, the camera microcomputer 102 causes the image-pickup element 103 to start capturing an image.

At S027', the camera microcomputer 102 determines whether or not the elapsed energization time that has been counted since S016 reaches the energization-reducing time period read at S003. If it has not reached the energization-reducing time period, the step S027' is repeated, and if it has reached the energization-reducing time period, the process proceeds to S028'.

At S028', the camera microcomputer 102 sends an instruction for reducing the energization amount of the stepping motor 119 to the lens microcomputer 112. Upon receipt of this instruction, the lens microcomputer 112 reduces the energization amount of the stepping motor 119 via the aperture stop microcomputer 115. Then, the process proceeds to S019.

Figure 6:
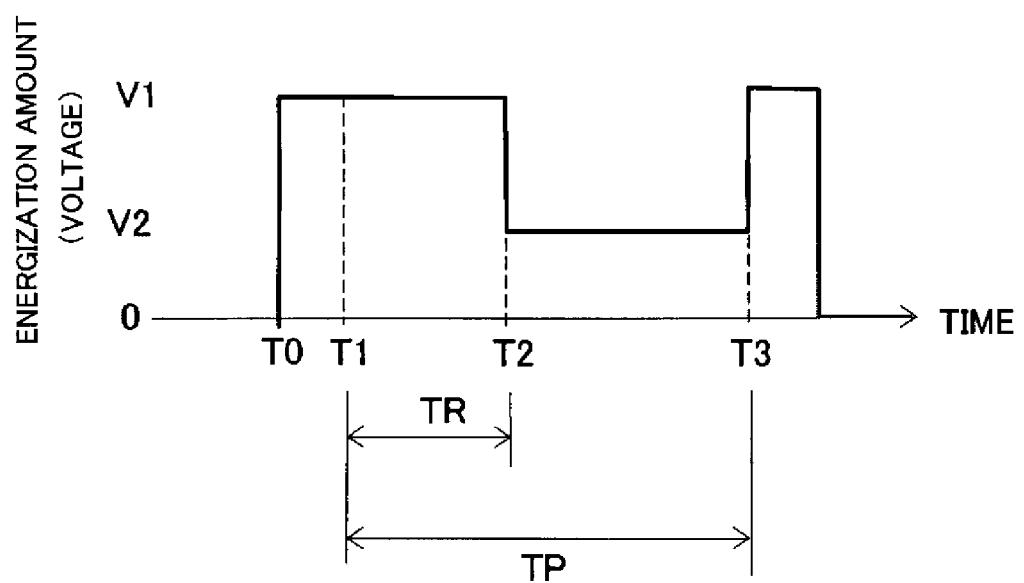
FIG. 6 shows a change in energizing state of an aperture stop actuator in the camera system of Embodiment 2.

FIG. 6 shows the change in the energizing state of the stepping motor 119 when the energization amount of the stepping motor 119 is reduced at the time when the elapsed energization time reaches the energization-reducing time period during the image-pickup period when the aperture stop 118 has been driven to the target aperture position.

At time T0, the energization (application of a voltage V1) of the stepping motor 119 is started to move the aperture stop 118 to the target aperture position. At time T1, the movement of the aperture stop 118 to the target aperture position is completed, and then the image-pickup operation is started. The image-pickup period (shutter opening time) is indicated by TP. Thereafter, the energization of the stepping motor 119 (application of the voltage V1) is maintained until the energization-reducing time period TR has elapsed (at time T2).

Then, after the energization-reducing time period TR has elapsed, the energization amount of the stepping motor 119 is reduced to a voltage V2 until T3 at which time the image-pickup period TP is completed. The voltage V2 is a voltage necessary and appropriate to maintain the rotation position of the stepping motor 119, (i.e., the aperture position). The voltage is, for example, equal to or less than half of V1.

When the image-pickup period TP is completed, the energization of the stepping motor 119 is again performed at a voltage of V1 to drive the aperture stop 118 to open.

As described above, according to the present embodiment, the amount of energization of the stepping motor 119 is reduced when the energization time reaches the energization-reducing time period set corresponding to the type of the stepping motor 119 during the image-pickup period when the aperture stop 118 has been driven to the target aperture position. Thereby, the energization amount of the stepping motor 119 can be reduced at a time suitable for the type of the stepping motor 119. Therefore, when using various types of motors, the aperture stop position can be maintained, and power consumption thereof and heat generated therefrom can be sufficiently reduced.

Embodiment 3

Figure 7:
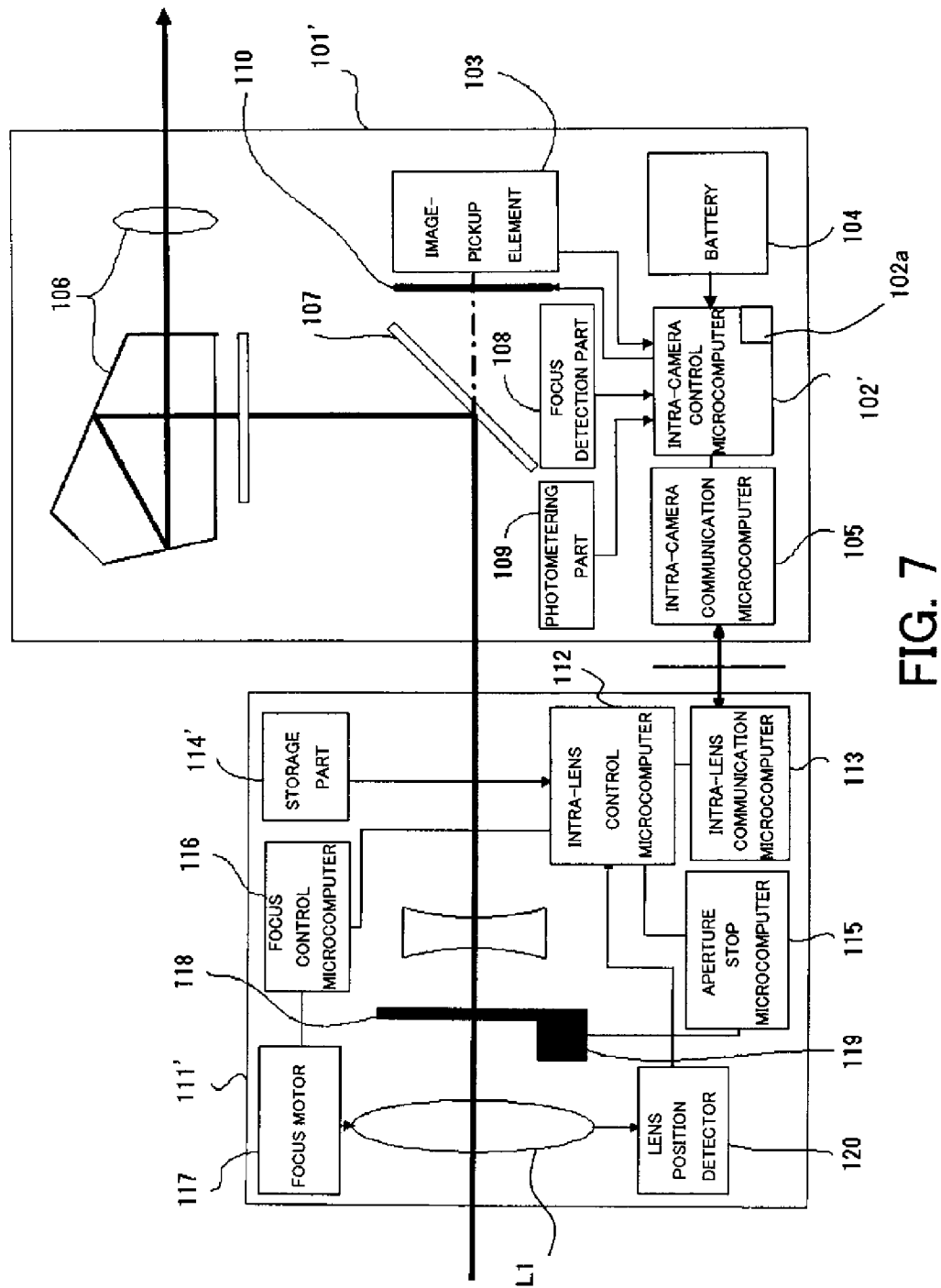
FIG. 7 is a block diagram showing the configuration of a camera system that is Embodiment 3 of the present invention.

FIG. 7 shows the configuration of a camera system (image-pickup system) including an interchangeable lens 111' and a single-lens reflex digital camera 101' that is Embodiment 3 of the present invention. In the present embodiment, the same reference numerals will be assigned to the components common to those in Embodiment 1.

Similarly to Embodiment 1, the storage part 114' in the lens 111' of the present embodiment stores information on the type of a stepping motor 119 that is an actuator for an aperture stop 118 provided in the lens 111'. However, unlike Embodiment 1, the storage part 114' does not store information on the energization-stopping time period.

In this embodiment, a storage part 102a provided in the camera microcomputer 102' stores information on the energization-stopping time period corresponding to the type of the stepping motor 119 as shown in FIG. 2.

For instance, upon receipt of information from the lens 111' on the energization-stopping time period of data code "2" stored in the storage part 114', the camera microcomputer 102' selects "1 second" corresponding to the data code among the energization-stopping time periods stored in the storage part 102a. In this case, if the shutter time set for appropriate exposure of an image-pickup element 103 is longer than 1 second, the camera microcomputer 102' sends an energization-stopping instruction to the lens microcomputer 112 in response to the elapse of 1 second. Upon receipt of the energization-stopping instruction, the lens microcomputer 112 stops the energization of the stepping motor 119 via an aperture stop microcomputer 115.

The same goes for the case where the camera microcomputer 102' receives data codes of other types.

Figure 8:
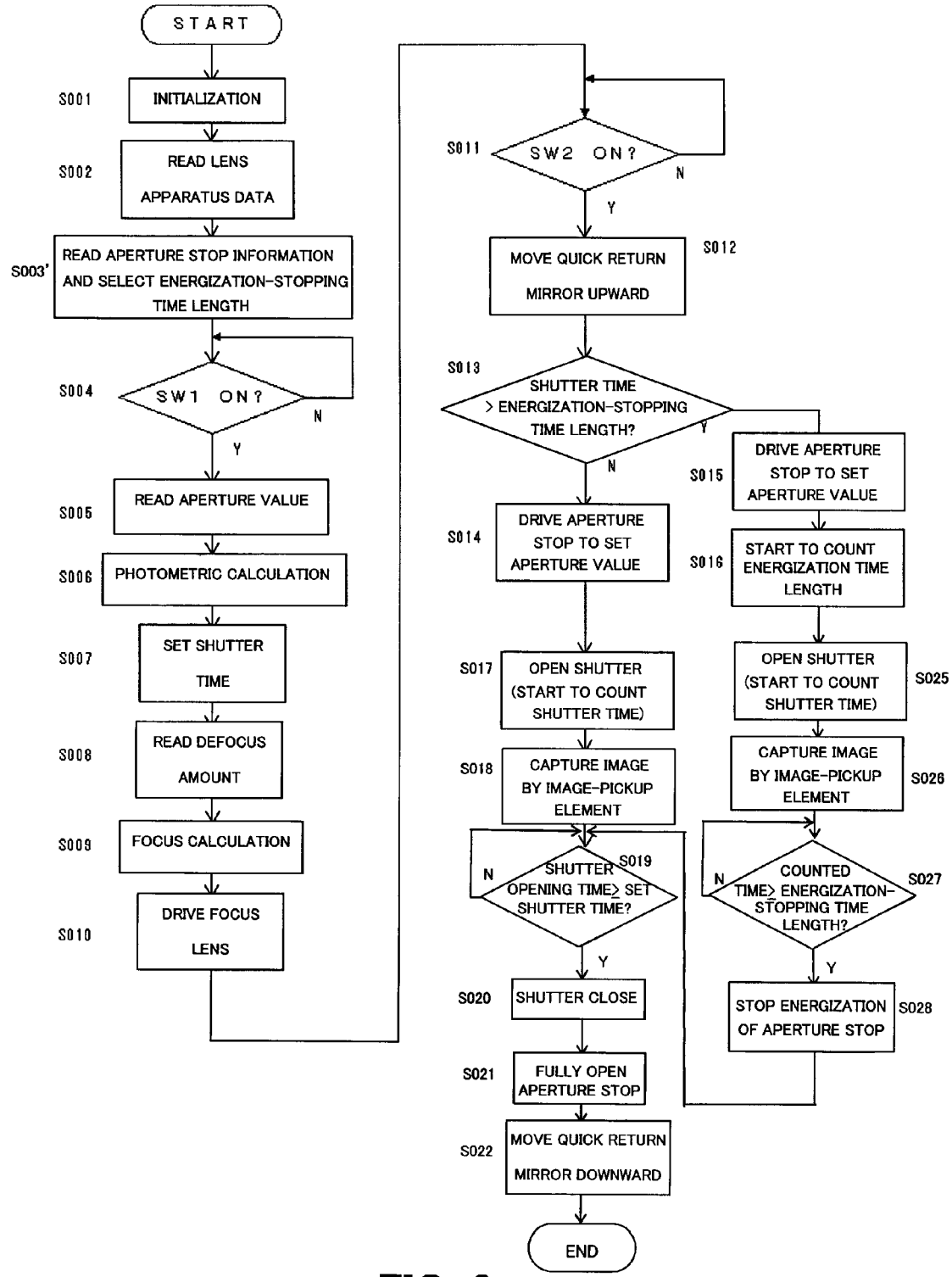
FIG. 8 is a flowchart showing an operation of the camera system of Embodiment 3.

FIG. 8 is a flowchart of an operation of the camera system in the present embodiment. In FIG. 8, the process is different from the flowchart of FIG. 3 of Embodiment 1 only in step S003'.

At S003', the camera microcomputer 102' reads out the above-described type information (data code) of the stepping motor 119 sent from the lens microcomputer 112, and reads out (selects) the energization-stopping time period corresponding to the data code from the storage part 102a.

Thereby, similarly to Embodiment 1, the energization of the stepping motor 119 is stopped when the energization time reaches the energization-stopping time period set corresponding to the type of the stepping motor 119 during the image-pickup period when the aperture stop 118 has been driven to the target aperture position. Thus, the energization of the stepping motor 119 is stopped at a time suitable for the type of the stepping motor 119. Therefore, when using various types of stepping motors, the aperture stop position can be maintained, and power consumption thereof and heat generated therefrom can be sufficiently reduced.

The energizing state of the stepping motor 119 in the present embodiment changes in a similar manner as shown in FIG. 4.

Although the present embodiment describes the case where the energization of the stepping motor 119 is stopped, the energization amount of the stepping motor 119 may be reduced in a similar manner to Embodiment 2. The energizing state of the stepping motor 119 in this case will change in a similar manner as shown in FIG. 6.

Figure 3:
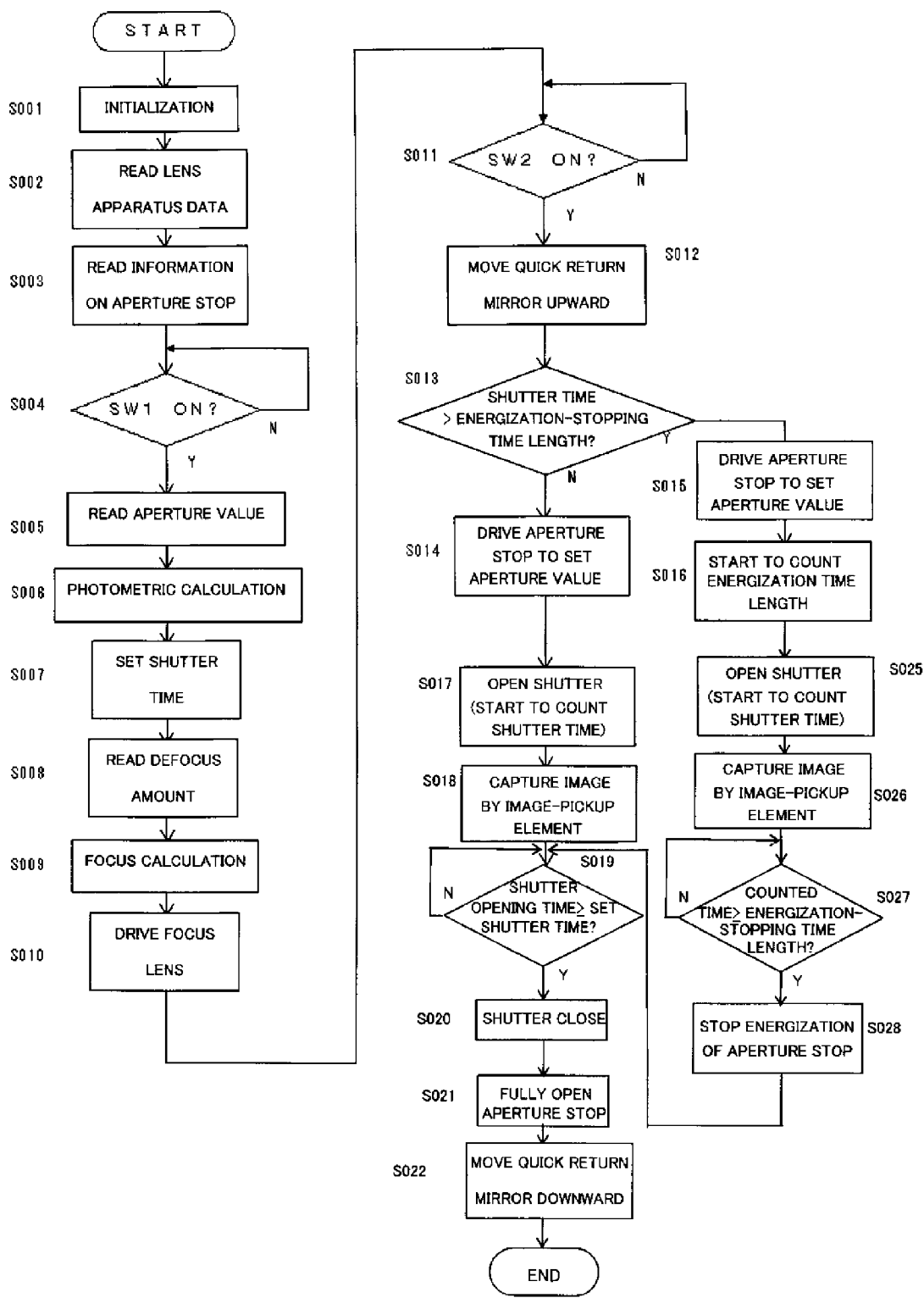
FIG. 3 is a flowchart showing an operation of the camera system of Embodiment 1.

The flowcharts of FIGS. 3, 5 and 8 of Embodiments 1 to 3 described the case where a so-called aperture-priority AE is used in which a photographer arbitrarily sets the aperture value and the camera microcomputer 102 calculates the shutter time so that appropriate exposure can be obtained for the aperture value. However, alternative embodiments of the present invention include a case where a so-called shutter-priority AE is used in which a photographer determines the shutter time and a case where a so-called program AE is used in which the camera microcomputer 102 determines the aperture value and the shutter time based on photometric information from the photometering part 109.

Although Embodiments 1 to 3 described the case where a continuous energization (continuous application of V1 or V2) of the stepping motor 119 is performed, an intermittent energization may be performed. When intermittent energization is performed during the drive of the aperture stop to the target aperture position as well as after the elapse of the energization-reducing time period, an energization duty ratio after the elapse of the energization-reducing time period may be made smaller than the energization duty ratio during the drive of the aperture stop to the target aperture position, without changing the voltage. In this case, the average energization amount after the elapse of the energization-reducing time period can be also reduced from that during the drive of the aperture stop to the target aperture position.

According to the above-described embodiments, the energization of the actuator for the aperture stop provided in the lens apparatus can be stopped or the energization amount can be reduced in response to the time elapsed for controlling the energization of the actuator (energization-stopping time period or energization-reducing time period) which is set according to the type of the actuator. Therefore, the energization of the aperture stop can be stopped or the energization amount can be reduced at a time suitable for the type of the actuator of the aperture stop. Thus, in lens apparatuses using various types of actuators for the aperture stop, the aperture position can be maintained, and power consumption thereof and heat generated therefrom can be sufficiently reduced.

Furthermore, embodiments of the present invention are not limited to the above-described embodiments and various variations and modifications may be made without departing from the scope of the present invention.

Although the above embodiments described the cases where the stepping motor is used as the actuator for driving the aperture stop as one example, alternative embodiments of the present invention include cases where actuators other than the stepping motor are used.

Furthermore, although the above embodiments described the cases where the single-lens reflex digital camera is used, an alternative embodiment of the present invention includes a lens-interchangeable-type video camera.

Furthermore, the present invention is not limited to these preferred embodiments and various variations and modifications may be made without departing from the scope of the present invention.

This application claims foreign priority benefits based on Japanese Patent Application No. 2006-255262, filed on Sep. 21, 2006, which is hereby incorporated by reference herein in its entirety as if fully set forth herein.

What is claimed is:

1. An image-pickup apparatus configured to receive a lens apparatus including an aperture stop and an actuator for driving the aperture stop, the image-pickup apparatus comprising:
   a controller that controls energization of the actuator for driving the aperture stop,
   wherein the controller receives from the lens apparatus information on a time period for controlling the energization of the actuator, the information being set corresponding to the type of the actuator,
   wherein, during an image-pickup period in a state in which the aperture stop has been driven to a target aperture position, the controller outputs to the lens apparatus an instruction for stopping the energization of the actuator or reducing an energization amount thereof in response to the elapse of the time period, and
   wherein the type of the actuator is determined based on a difference in ability of holding a rotation position of the actuator in a state where the energization thereof is stopped or a difference in package material of the actuator.

2. An image-pickup system including an image-pickup apparatus and a lens apparatus, the image-pickup system comprising:
   the lens apparatus including:
      an aperture stop;
      an actuator for driving the aperture stop;

a memory that stores information on a time period for controlling energization of the actuator, the information being set corresponding to the type of the actuator; and a communication unit that outputs the information to the image-pickup apparatus;

the image-pickup apparatus including;

a controller that controls energization of the actuator for driving the aperture stop;

wherein the controller receives from the lens apparatus information on the time period for controlling the energization of the actuator;

wherein, during an image-pickup period in a state in which the aperture stop has been driven to a target aperture position, the controller outputs to the lens apparatus an instruction for stopping the energization of the actuator or reducing an energization amount thereof in response to the elapse of the time period, and wherein the type of the actuator is determined based on a difference in ability of holding a rotation position of the actuator in a state where the energization thereof is stopped or a difference in package material of the actuator.

3. A lens apparatus including an aperture stop and an actuator configured to drive the aperture stop, the lens apparatus configured to be detachably mounted to an image-pickup apparatus which includes a controller configured to control energization of the actuator for driving the aperture stop, the lens apparatus comprising:

a memory that stores information on a time period for controlling energization of the actuator for driving the aperture stop, the information being set corresponding to the type of the actuator; and a communication unit that outputs the information to the image-pickup apparatus, wherein the controller receives from the lens apparatus information on a time period for controlling the energization of the actuator, the information being set corresponding to the type of the actuator, wherein, during an image-pickup period in a state in which the aperture stop has been driven to a target aperture position, the controller outputs to the lens apparatus an instruction for stopping the energization of the actuator or reducing an energization amount thereof in response to the elapse of the time period, and wherein the type of the actuator is determined based on a difference in ability of holding a rotation position of the actuator in a state where the energization thereof is stopped or a difference in package material if the actuator.

4. An image-pickup apparatus configured to receive a lens apparatus including an aperture stop and an actuator for driving the aperture stop, wherein the lens apparatus outputs information on the type of an actuator for driving the aperture stop and the image-pickup apparatus receives the information, the image-pickup apparatus comprising:

a controller that controls energization of the actuator, wherein, during an image-pickup period in a state in which the aperture stop has been driven to a target aperture position, the controller outputs to the lens apparatus an instruction for stopping the energization of the actuator or reducing an energization amount thereof in response to the elapse of a time period set corresponding to the information, and wherein the type of the actuator is determined based on a difference in ability of holding a rotation position of the actuator in a state where the energization thereof is stopped or a difference in package material of the actuator.

5. An image-pickup system including an image-pickup apparatus and a lens apparatus, the image-pickup system comprising:

the lens apparatus including:

an aperture stop;

an actuator for driving the aperture stop; and a memory that stores information on the type of an actuator for driving the aperture stop; and a communication unit that outputs the information to the image-pickup apparatus, wherein the lens apparatus outputs information on the type of an actuator for driving the aperture stop and the image-pickup apparatus receives the information, the image-pickup apparatus including:

a controller that controls energization of the actuator, wherein, during an image-pickup period in a state in which the aperture stop has been driven to a target aperture position, the controller outputs to the lens apparatus an instruction for stopping the energization of the actuator or reducing an energization amount thereof in response to the elapse of a time period set corresponding to the information, and wherein the type of the actuator is determined based on a difference in ability of holding a rotation position of the actuator in a state where the energization thereof is stopped or a difference in package material of the actuator.

6. A lens apparatus including an aperture stop and an actuator configured to drive the aperture stop, the lens apparatus configured to be detachably mounted to an image-pickup apparatus which includes a controller configured to control energization of the actuator for driving the aperture stop, the lens apparatus comprising:

a memory that stores information on the type of an actuator for driving the aperture stop; and a communication unit that outputs the information to the image-pickup apparatus, wherein the lens apparatus outputs information on the type of an actuator for driving the aperture stop and the image-pickup apparatus receives the information, and wherein, during an image-pickup period in a state in which the aperture stop has been driven to a target aperture position, the controller outputs to the lens apparatus an instruction for stopping the energization of the actuator or reducing an energization amount thereof in response to the elapse of a time period set corresponding to the information, and wherein the type of the actuator is determined based on a difference in ability of holding a rotation position of the actuator in a state where the energization thereof is stopped or a difference in package material of the actuator.

* * * * *